United States Patent
Waltz et al.

(10) Patent No.: US 10,066,672 B2
(45) Date of Patent: Sep. 4, 2018

(54) TAPERED WASHER SHAFT JACKING ARRANGEMENT

(71) Applicant: Fluid Handling LLC., Morton Grove, IL (US)

(72) Inventors: Stephen W. Waltz, Oconomowoc, WI (US); Bruce M. Burkelman, Naperville, IL (US); James R. Roberts, Grayslake, IL (US); Joel E. Swanson, Western Springs, IL (US)

(73) Assignee: Fluid Handling LLC, Morton Grove, IL (US)

( * ) Notice: Subject to any disclaimer, the term of this patent is extended or adjusted under 35 U.S.C. 154(b) by 317 days.

(21) Appl. No.: 14/816,643

(22) Filed: Aug. 3, 2015

(65) Prior Publication Data

US 2016/0290408 A1  Oct. 6, 2016

Related U.S. Application Data

(60) Provisional application No. 62/032,787, filed on Aug. 4, 2014.

(51) Int. Cl.
*F16D 1/04* (2006.01)
*F16D 1/08* (2006.01)

(52) U.S. Cl.
CPC ............ *F16D 1/04* (2013.01); *F16D 1/0864* (2013.01)

(58) Field of Classification Search
CPC ......... Y10T 403/5761; Y10T 403/5766; Y10T 403/5793; Y10T 403/5781; F16D 1/02;
(Continued)

(56) References Cited

U.S. PATENT DOCUMENTS 1,806,687 A * 5/1931 Hoover .................... E04G 7/20
  403/312
1,944,141 A * 1/1934 Stidd ..................... F16B 7/0426
  403/310
(Continued)

FOREIGN PATENT DOCUMENTS

DE  2943713 A1 * 5/1981  ........ B01F 15/00441
EP  0621412  10/1994

OTHER PUBLICATIONS

EP0621412 English Language Abstract (1 page).
(Continued)

*Primary Examiner* — Daniel J Wiley
(74) *Attorney, Agent, or Firm* — Ware, Fressola, Maguire & Barber LLP (57) ABSTRACT

A vertical in-line split couple pump includes a motor shaft having a motor shaft collar; a pump shaft having a pump shaft collar with a pump shaft angled collar surface oblique to an axis of the motor and pump shafts; and a coupler having coupler halves that attach together, that have a couple groove to receive the motor shaft collar, and have a couple angled groove to receive the pump shaft collar. The couple angled groove has a couple angled groove surface oblique to the axis. The coupler halves respond to a force that moves them together to couple the pump and motor shaft together, moves the pump shaft angled collar surface in relation to the couple angled groove surface, causing the pump shaft to move upwardly towards the motor shaft along the axis, to provide a way to jack-up and recouple the pump shaft and any impeller attached thereto by one mechanic.

14 Claims, 5 Drawing Sheets

(58) Field of Classification Search
CPC .......... F16D 1/033; F16D 1/05; F16D 1/0864; F16D 1/0847; F16D 1/09; F16D 1/091; F16B 7/02; F16B 7/025; F16B 7/0426; F16B 7/182
See application file for complete search history.

(56) References Cited

U.S. PATENT DOCUMENTS

| | | | | |
|---|---|---|---|---|
| 1,951,220 | A * | 3/1934 | Tarr | E04G 7/20 403/312 |
| 2,303,031 | A * | 11/1942 | Dusevoir | F16D 1/033 248/230.5 |
| 2,303,032 | A * | 11/1942 | Dusevoir | F16D 1/033 248/230.5 |
| 2,496,702 | A | 2/1950 | Dykman et al. | |
| 3,466,896 | A * | 9/1969 | Pfarrwaller | F16D 1/04 464/91 |
| 3,692,336 | A * | 9/1972 | Zon | F16L 37/0925 285/148.19 |
| 3,838,987 | A * | 10/1974 | Draut | F16D 1/02 29/426.2 |
| 4,106,393 | A * | 8/1978 | Dodson | F04B 53/144 403/338 |
| 4,169,394 | A | 10/1979 | Estrada | |
| 4,781,486 | A | 11/1988 | Mochizuki | |
| 4,793,040 | A | 12/1988 | Rumberger | |
| 5,082,391 | A * | 1/1992 | Florida | F16B 7/0426 285/184 |
| 5,098,216 | A * | 3/1992 | Caperton | F16B 7/22 403/286 |
| 5,154,652 | A * | 10/1992 | Ecklesdafer | B63H 23/34 403/312 |
| 5,192,142 | A | 3/1993 | Hyll | |
| 5,421,623 | A | 6/1995 | Cassin | |
| 5,902,066 | A | 5/1999 | Griffen et al. | |
| 6,446,541 | B1 * | 9/2002 | Eriksson | F16D 1/05 403/367 |
| 6,824,471 | B2 | 11/2004 | Kamenov | |
| 6,868,774 | B2 * | 3/2005 | McCollough | F04B 9/125 403/300 |
| 7,074,017 | B2 | 7/2006 | Coray et al. | |
| RE39,228 | E | 8/2006 | Claxton, III et al. | |
| 7,217,193 | B2 | 5/2007 | Nisley | |
| 7,322,805 | B2 | 1/2008 | Biver et al. | |
| 7,648,176 | B2 | 1/2010 | Van Bilderbeek | |
| 7,827,666 | B2 | 11/2010 | Harlon et al. | |
| 7,980,833 | B1 | 7/2011 | Golden, III | |
| 8,426,804 | B2 | 4/2013 | Anderson, III et al. | |
| 8,517,655 | B2 | 8/2013 | Wang | |
| 8,696,231 | B2 * | 4/2014 | McCarty | F16K 1/48 251/285 |
| 8,758,149 | B1 | 6/2014 | Hewitt et al. | |
| 2004/0155216 | A1 * | 8/2004 | McCarty | F16B 7/0426 251/214 |
| 2006/0222537 | A1 | 10/2006 | Kilty | |
| 2010/0129142 | A1 * | 5/2010 | Leman | E21B 43/127 403/71 |
| 2013/0039696 | A1 | 2/2013 | Mori et al. | |

OTHER PUBLICATIONS

"So-Cal Speed Shop Tapered Washer for Perches," hawkhardware.com http://hawkhardware.com/index.php?main_page=index&cPath=1_10_13_125 Discloses a tapered washer for perches steel. Copyright 2014.

"Wolfrace Tapered Washers," https://web.archive.org/web/20120423151512/http://www.raceways.co.uk/Washers_and_conversion_washers.htm. Mar. 2011-Jul. 2013 Discloses tapered washers available in small bore or large bore fitting.

* cited by examiner

TAPERED WASHER SHAFT JACKING ARRANGEMENT

CROSS-REFERENCE TO RELATED APPLICATIONS

This application claims benefit to provisional application Ser. No. 62/032,787, filed 4 Aug. 2014, which is hereby incorporated by reference in its entirety.

BACKGROUND OF THE INVENTION

1. Field of the Invention

The present invention relates to a pump; and more particularly, the present invention relates to a vertical in-line split coupled pump having a coupler that attaches a motor shaft to a pump shaft.

2. Brief Description of Related Art

In vertical in-line split coupled pumps that are known in the art, when the coupling (or coupler) is removed, both the pump shaft and the connected impeller drop to the bottom of the pump casing volute because there is nothing to support them. The coupling consists of two split coupler halves that each wrap almost half way around the pump and motor shafts and have bolts that hold the halves together such that they clamp onto the motor and pump shaft when tightened to carry the rotation from the motor to the pump during operation. The coupling has to be removed on a regular basis on these pumps to change the mechanical seal through the gap between the shafts as well as to do other maintenance operations, and then for reassembly, the pump shaft and impeller must be lifted back up to their original position to reassemble the split coupling. In the current known prior art design (e.g., see FIG. 1), a square section collar ring is located in a groove in the pump shaft that also fits into a groove in the coupling to support the shaft and impeller. To assemble the square section collar ring into the coupling groove, the pump shaft and impeller must first be lifted by some external means. Often a crow bar or some other external device is used to lift up the fallen pump shaft and impeller. Typically, this involves a two mechanic operation, where one mechanic uses the crow bar or other external device, while another mechanic reassembles the split coupling to reconnect the pump and motor shafts.

There is a need in the industry for a better and more efficient way to couple together the pump and motor shafts, so that the performance of regular maintenance operations that involve de-coupling and reassembling the pump and motor shafts does not necessarily require a two mechanics.

SUMMARY OF THE INVENTION

In summary, according to the present invention, the split coupling itself and a tapered washer attached to the pump shaft may be used to lift the fallen shaft and impeller. No crowbar or external device is required and the operation can be done by one mechanic.

Examples of Particular Embodiments

According to some embodiments of the present invention, either the pump shaft or the motor shaft, or both, may be configured with a tapered washer/portion configuration.

By way of example, and according to some embodiments, the apparatus may take the form of the pump shaft alone being configured with the tapered washer/portion configuration, as follows:

a motor shaft configured with a motor shaft collar;

a pump shaft having a pump shaft collar configured or formed with a pump shaft angled collar surface that is oblique to an axis of the motor and pump shafts; and a coupler having two coupler halves configured to attach together, configured with a couple groove to receive the motor shaft collar, and configured with a couple angled groove to receive the pump shaft collar, the couple angled groove having a couple angled groove surface that is oblique to the axis of the motor and pump shafts, the coupler halves configured to respond to a force that moves the coupler halves together to couple the pump shaft and motor shaft together and also moves the pump shaft angled collar surface in relation to the couple angled groove surface, causing the pump shaft to lift and move upwardly towards the motor shaft along the axis, so as to provide a way to jack-up and recouple the pump shaft and any impeller attached thereto by one mechanic.

The pump shaft collar may include, or take the form of, a tapered washer that is attached to an end of the pump shaft.

The pump shaft collar and the pump shaft may be formed as an integral unit, including being molded together as one piece.

The motor shaft collar may include, or take the form of, a corresponding tapered washer that is attached to an end of the motor shaft.

The motor shaft collar and the motor shaft may be formed as an integral unit, including being molded together as one piece.

By way of further example, and according to some embodiments, the apparatus may take the form of both the pump shaft and the motor shaft being configured with the tapered washer/portion configuration, as follows: For example, the motor shaft collar may be configured or formed with a tapered collar, ring or washer, e.g., that is attached to an end of the motor shaft, the tapered washer having motor shaft angled collar surface. The couple groove may also be angled and having a couple angled groove surface that is oblique to the axis, so that when the coupler halves respond to the force, the motor shaft angled collar surface moves in relation to the couple angled groove surface, causing the pump shaft to lift and move upwardly towards the motor shaft along the axis.

By way of still a further example, and according to some embodiments, the apparatus may take the form of the motor shaft alone being configured with the tapered washer/portion configuration, as follows:

a motor shaft having a motor shaft collar configured or formed with a motor shaft angled collar surface that is oblique to an axis of the motor and pump shafts;

a pump shaft having a pump shaft collar; and a coupler having two coupler halves configured to attach together, configured with a couple angled groove to receive the motor shaft collar, the couple angled groove having a couple angled groove surface that is oblique to the axis of the motor and pump shafts, and configured with a couple groove to receive the pump shaft collar, the coupler halves configured to respond to a force that moves the coupler halves together to couple the pump shaft and motor shaft together and also moves the motor shaft angled collar surface in relation to the couple angled groove surface, causing the pump shaft to lift and move upwardly towards the motor shaft along the axis, so as to provide a way to jack-up and recouple the pump shaft and any impeller attached thereto by one mechanic.

The apparatus may include, or form part of, a vertical in-line split couple pump.

One advantage of the present invention it that it provides a better and more efficient way to couple together the pump and motor shafts, so that the performance of regular maintenance operations that involve de-coupling and reassembling the pump and motor shafts does not necessarily require a two mechanics. Because of this, the new and unique tapered washer connection according to the present invention provides an important contribution to the state of the art.

BRIEF DESCRIPTION OF THE DRAWING

The drawing includes the following Figures, not necessarily drawn to scale.

DETAILED DESCRIPTION OF THE INVENTION

The Basic Invention

Figure 5:
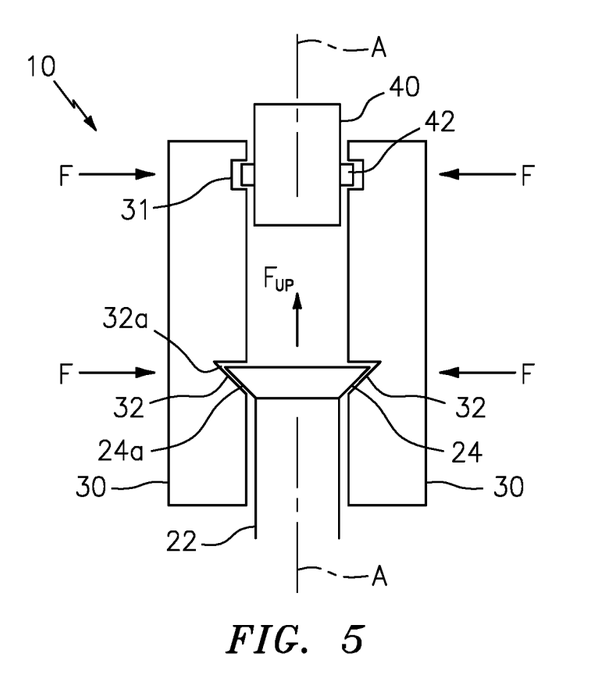
FIG. 5 shows a diagram of split coupler halves arranged in relation to a motor shaft like that shown in FIG. 4 and a tapered washer connection like that shown in FIGS. 2-3, where a force from coupler bolts causes the angled groove in the coupling through the tapered washer to lift the pump shaft and impeller up, according to some embodiments of the present invention.

As shown in FIGS. 2-8, and by way of example, the basic invention may take the form of apparatus generally indicated as 10 (FIG. 5) or 10' (FIG. 8), as follows:

In FIG. 5, the apparatus 10 may include:
a motor shaft 40 configured with a motor shaft collar 42;
a pump shaft 22 configured with a pump shaft collar 24 (e.g., in the form of a tapered washer as shown) having a pump shaft angled collar surface 24a that is oblique to an axis A of the motor and pump shafts; and a coupler having, or formed by, two coupler halves 30 configured to attach together, configured with a couple groove 31 to receive the motor shaft collar 42, and also configured with a couple angled groove 32 to receive the pump shaft collar 24, the couple angled groove 32 having a couple angled groove surface 32a that is oblique to the axis A of the motor and pump shafts 40, 22, the two coupler halves 30 configured to respond to a force F (e.g., when the coupler bolts are tightened) that moves the two coupler halves 30 together (i.e., perpendicular to the axis A of the motor and pump shafts) to couple the pump shaft 22 and motor shaft 40 together and also moves the couple angled groove surface 32a in relation to the pump shaft angled collar surface 24a, causing the pump shaft 22 to lift or move upwardly towards the motor shaft 40 along the axis A, so as to provide a way to jack-up and recouple the pump shaft 22 and any impeller (not shown) attached thereto by one mechanic.

Figure 8:
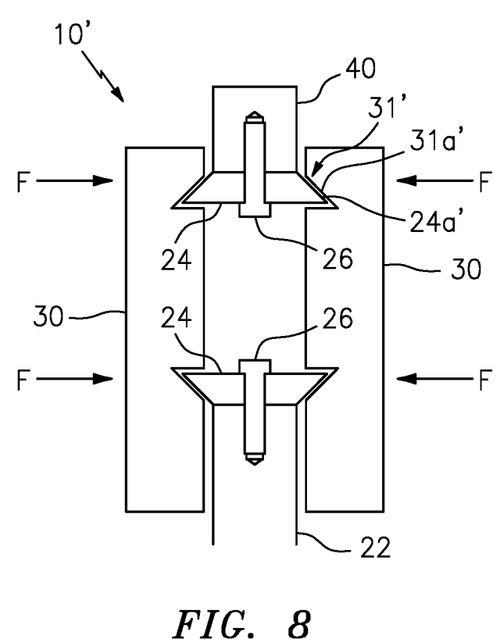
FIG. 8 shows a diagram of split coupler halves arranged in relation to a motor shaft, e.g., with tapers on both motor and pump shafts such that both tapers would apply force to lift the pump shaft and impeller from the bottom of a casing volute, according to some embodiments of the present invention.

FIG. 8 shows an alternative embodiment in the form of apparatus 10', where both the pump shaft 22 and the motor shaft 40 are configured with a tapered washer/portion configuration. In FIG. 8, the motor shaft 40 may include the motor shaft collar configured or formed with a tapered ring, collar or washer 24 that is attached to the end of the motor shaft 40. The tapered collar, ring or washer 24 may include a motor shaft angled collar surface 24a'. The split coupler half 30 may be configured with the couple groove 31' also being angled and having a motor shaft couple angled groove surface 31a' that is oblique to the axis A, so that when the coupler halves 30 respond to the force F (e.g., when the coupler bolts are tightened), the motor shaft angled collar surface 24a' moves in relation to the motor shaft couple angled groove surface 31a', causing the pump shaft 22 to lift or move upwardly towards the motor shaft 40 along the axis A.

Figure 3:
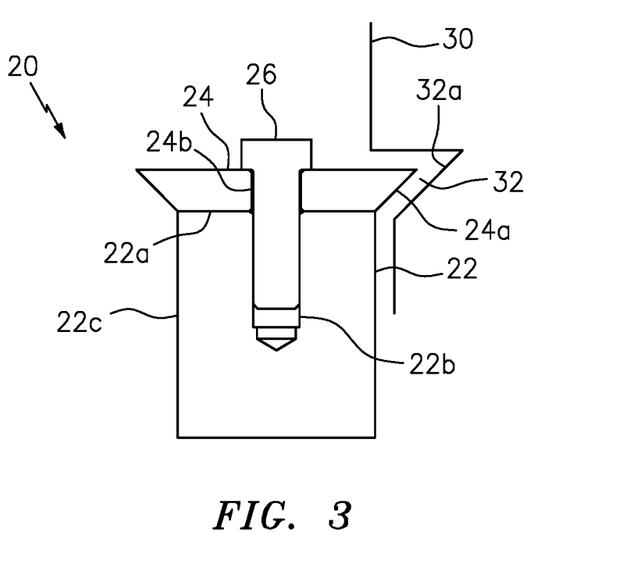
FIG. 3 shows a diagram of the tapered washer connection to the pump shaft in FIG. 2 arranged in relation to a split coupler half, where the angle for a tapered washer and a groove in the split coupler half are about the same, according to some embodiments of the present invention.
Figure 4:
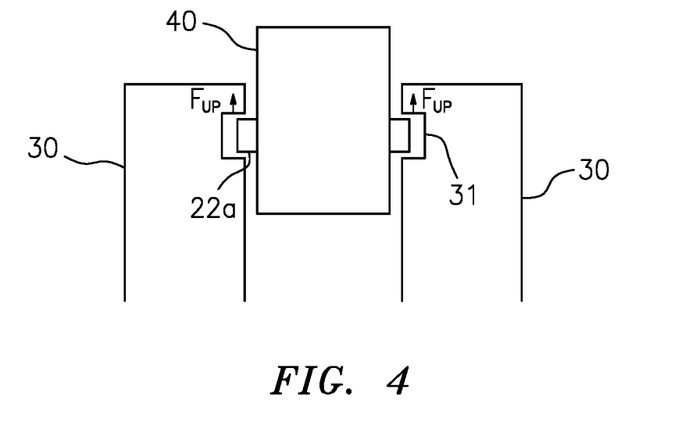
FIG. 4 shows a diagram of split coupler halves arranged in relation to a motor shaft, where a set screw collar on the motor shaft supports the split coupler halves, according to some embodiments of the present invention.

As a person skilled in the art would appreciate, the angle or orientation of the couple angled groove surface 32a and the pump shaft angled collar surface 24a, as well as the orientation of the motor shaft angled collar surface 24a' and the motor shaft couple angled groove surface 31a', including in relation to the axis A of the pump and motor shafts, are substantially similar to one another, substantially correspond to one another, or are substantially the same as one another, e.g., consistent with that shown and described in FIGS. 3, 5 and 8.

Figure 2:
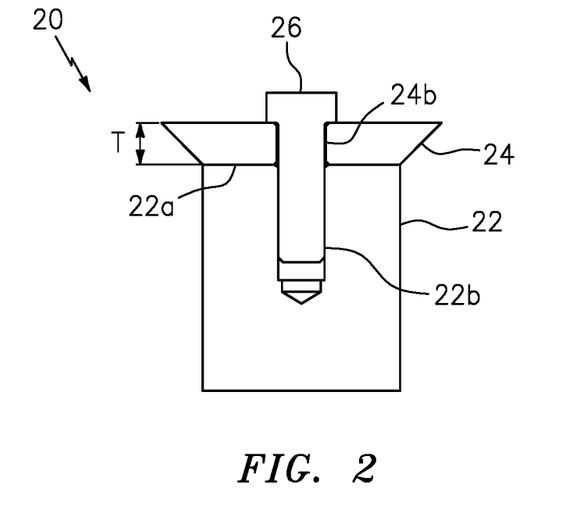
FIG. 2 shows a diagram of a tapered washer connection to a pump shaft, according to some embodiments of the present invention.

FIGS. 2 and 3

FIGS. 2 and 3 show an example of the tapered washer/portion connection or configuration generally indicated as 20. In effect, the present invention works by attaching the tapered washer 24 to the top face 22a of the pump shaft 22 using a bolt 26, e.g., that is threaded through the hole 24b in the top of the tapered washer 24 and into a tapped hole 22b in the top or end 22c of the pump shaft 22 (see FIGS. 2 and 3). However, embodiments are envisioned, and the scope of the invention is intended to include, using different methods of attachment between the tapered washer 24 and the pump shaft 22. By way of example, the bolt thickness of the tapered washer 24 may be selected to be larger than a maximum possible height that the pump shaft 22 and impeller (not shown) need to be lifted during re-assembly. As shown in FIG. 3, the coupling or split coupler may be configured as the angled groove 32 formed in the split coupler half 30, e.g., that substantially matches the taper or angle on the tapered washer 24 (see FIG. 3). In other words, the angle for the tapered washer 24 and the angled groove 32 in the split coupler half 30 are substantially or about the same, as shown in FIG. 3. In FIG. 3, by way of example, the angle is shown to be about 45°, although the scope of the invention is not intended to be limited to any particular angle. For example, embodiments are envisioned, and the scope of the invention is intended to include, using other angles that are greater or less than about 45°.

In operation, with this invention, for re-assembly the coupling is first lightly applied over both the pump shaft 22 and the motor shaft 40, e.g., as shown in FIGS. 4-8. A set screw collar or split ring 42 may be attached to the motor shaft 40 that fits into a square couple groove 31 in the coupling or coupler half 30 that holds the coupler halves 30 from falling off the motor shaft 40 (e.g., see FIG. 4), but the loosely fitted coupler halves 30 could be supported by other means instead of a set screw collar or split ring. Bolts may then be used to tighten the loosely fitted split coupler halves 30, e.g., by applying a force F that pulls the coupler halves 30 together that also acts on the tapered washer 24 to move the tapered washer 24 up the angled surface 32a of the matching groove 32 in the coupling 30 (see FIG. 5). In other words, the force F causes the couple angled groove surface 32a to move in relation to the pump shaft angled collar surface 24a. Through the act of moving up the angle, the tapered washer 24 and connected pump shaft 22 and impeller (not shown) are lifted without any external jacking device.

Figure 6:
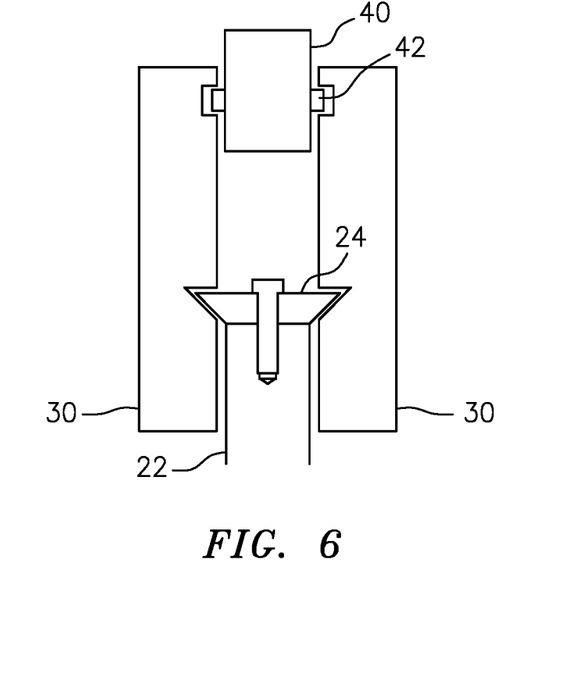
FIG. 6 shows a diagram of the split coupler halves arranged in relation to the motor shaft and the tapered washer connection shown in FIG. 5, e.g., when the pump shaft and impeller are lifted all of the way up, and the pump is ready for operation, according to some embodiments of the present invention.
Figure 7:
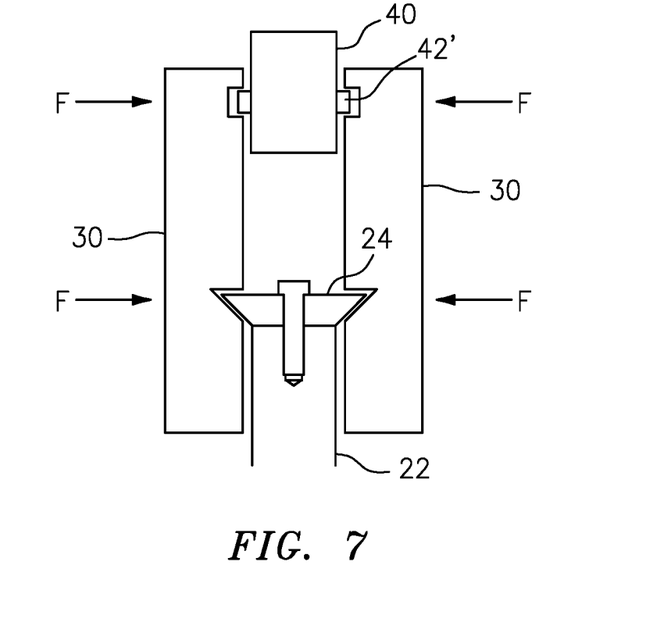
FIG. 7 shows a diagram of split coupler halves arranged in relation to a motor shaft having collar rings formed as a square section and a pump shaft having a tapered washer connection, according to some embodiments of the present invention.

By way of example, the bolts attaching the split coupler halves 30 may then be sequentially tightened until they have hoisted the pump shaft 22 and impeller (not shown) back to their original height and the split coupler halves 30 are properly tightened around both the pump shaft 22 and motor shaft 40 (e.g., see FIG. 6).

Figure 1:
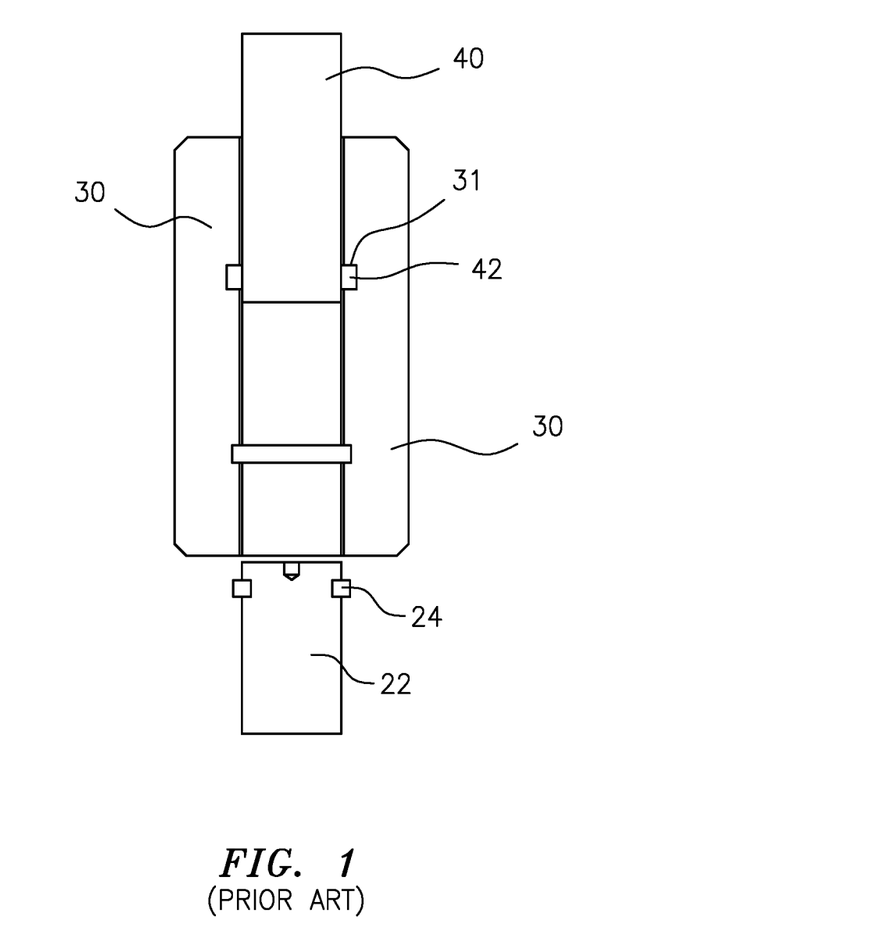
FIG. 1 shows a diagram of a current method used in pumps that requires an external device to lift up the pump shaft and impeller after they fall to the bottom of the casing volute upon disassembly.

In the prior art, the collar rings used on the pump shaft and the motor shaft both have square collars or sections and do not have an angled surface, e.g., consistent with that shown in FIG. 1. In the embodiment according to the present invention in FIGS. 2-7, the collar ring 42 on the motor shaft 40 is shown as having a square collar or section, but the pump shaft 22 is shown having a tapered design to lift the pump shaft 22 and the impeller (not shown) when the two coupler halves 30 of the split coupling are assembled together. However, in an alternative embodiment of the present invention, tapers or angled grooves may be applied or configured on both the collars on the motor shaft 40 and pump shafts 22 (e.g., see FIG. 8), such that both tapers would apply force to lift the pump shaft 22 and the impeller (not shown) from the bottom of the casing volute. In FIG. 8, by way of further example, both the pump shaft 22 and the motor shaft 40 are shown having the tapered washer or collar rings, each labeled with the reference label 24, and also have bolts 26, each holding the tapered washer or collar rings 24 respectively to the pump shaft 22 and the motor shaft 40. The motor shaft collar 24 has a motor shaft angled collar surface 24a'; the couple groove 31' has a motor shaft couple groove surface 31a' that is oblique to the axis A of the pump and motor shafts; such that when the coupler halves 30 respond to the force F (e.g., when the coupler bolts are tightened), the motor shaft angled collar surface 24a' moves in relation to the motor shaft couple groove surface 31a', causing the pump shaft 22 to lift or move upwardly towards the motor shaft 40 along the axis A of the pump and motor shafts. With tapers on both motor and pump shafts, both taper washers 24 would apply force to lift the pump shaft 22 and impeller (not shown) from the bottom of a casing volute.

Examples of Tapered Washer/Portion Configurations

In FIGS. 2-8, and by way of example, the tapered washer 24 may be configured or shaped as a frustum, e.g., as the basal part of a solid cone or pyramid formed by cutting off the top by a plane parallel to the base. The frustum may include a flat base surface and a flat top surface that are formed as substantially parallel planes. The flat base surface may have a greater diameter than the flat top surface, and may have a conical surface connecting the flat base surface and the flat top surface so as to form the angled collar surface. As shown, the flat top surface may be attached to the pump shaft, including using a bolt or fastener.

Alternatively, and by way of further examples, embodiments are also envisioned, and the scope of the invention is also intended to include, the pump shaft and/or the motor shaft being configured or formed with a tapered portion, e.g., corresponding to the tapered washer. In this type of embodiment, the pump shaft and/or the motor shaft may be configured or formed with the tapered portion as one integral piece, e.g., made or manufactured as an integral molded piece.

Furthermore, embodiments are envisioned, and the scope of the invention is intended to include, using other types or kinds of tapered portions that are now known or later developed in the art. As a person skilled in the art would appreciate, the split coupler would have coupler halves having a complementary tapered portion-like shape. By way of example, embodiments are envisioned, and the scope of the invention is intended to include, using other types or kinds of tapered portions like a tapered pyramid-like portion, e.g., that may take the form of a polyhedron having for its base a polygon and for its faces three of more triangular surfaces that have a common vertex. As a person skilled in the art would appreciate, the split coupler would have coupler halves having a complementary tapered pyramid-like shape in order to couple to the same.

Oblique Angle in Relation to the Axis A of the Pump and Motor Shafts

The angle of pump shaft angled collar surface 24a (e.g., see FIGS. 3, 5 and 8) that is oblique to the axis A of the motor and pump shafts 40, 22 is about 45°, angled upwardly away from the top of pump shaft 22, towards the bottom of motor shaft 40 and acute to the axis A of the motor and pump shafts 40, 22.

In comparison, the angle of motor shaft angled collar surface 31a' (e.g., see FIG. 8) that is oblique to the axis A of the motor and pump shafts 40, 22 is also about 45°, angled downwardly away from the bottom of motor shaft 40, towards the top of the pump shaft 22 and acute to the axis A of the motor and pump shafts 40, 22.

Consistent with that stated above, embodiments are also envisioned, and the scope of the invention is also intended to include, using other angles that are greater or less than about 45°.

The Scope of the Invention

Unless stated otherwise herein, any of the features, characteristics, alternatives or modifications described regarding a particular embodiment herein may also be applied, used, or incorporated with any other embodiment described herein. Also, the Figures in the drawings herein are not necessarily drawing to scale.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
    a motor shaft configured with a motor shaft collar;
    a pump shaft configured with a pump shaft collar having a pump shaft angled collar surface that is oblique to an axis of the motor shaft and the pump shaft;
    a coupler having two coupler halves configured to attach together to couple the pump shaft and motor shaft, configured with a couple groove to receive the motor shaft collar, and configured with a couple angled groove to receive the pump shaft collar, the couple angled groove having a couple angled groove surface that is oblique to the axis of the motor shaft and the pump shaft, the coupler halves configured to respond to a force that moves the coupler halves together to couple the pump shaft and motor shaft together and also moves the pump shaft angled collar surface in relation to the couple angled groove surface, causing the pump shaft to lift or move upwardly towards the motor shaft along the axis, so as to provide a way to jack-up and recouple the pump shaft and any impeller attached thereto by one mechanic.

2. Apparatus according to claim 1, wherein the pump shaft collar comprises a tapered washer that is attached to an end of the pump shaft.

3. Apparatus according to claim 1, wherein the pump shaft collar and the pump shaft are formed as an integral unit, including being molded together as one piece.

4. Apparatus according to claim 1, wherein the motor shaft collar comprises a tapered washer that is attached to an end of the motor shaft.

5. Apparatus according to claim 1, wherein the motor shaft collar and the motor shaft are formed as an integral unit, including being molded together as one piece.

6. Apparatus according to claim 1, wherein
    the motor shaft collar is configured or formed with a tapered washer that is attached to an end of the motor shaft, the tapered washer including a motor shaft angled collar surface that is oblique to the axis; and
    the couple groove is angled and has a motor shaft couple groove surface that is oblique to the axis, so that when the coupler halves respond to the force, the motor shaft angled collar surface moves in relation to the motor shaft couple groove surface, causing the pump shaft to lift or move upwardly towards the motor shaft along the axis.

7. Apparatus according to claim 1, wherein the apparatus comprises, or forms part of, a vertical in-line split couple pump.

8. Apparatus comprising:
    a motor shaft having a motor shaft collar configured or formed with a motor shaft angled collar surface that is oblique to an axis of the motor and pump shafts;
    a pump shaft having a pump shaft collar; and
    a coupler having two coupler halves configured to attach together, configured with a couple angled groove to receive the motor shaft collar, the couple angled groove having a couple angled groove surface that is oblique to the axis of the motor and pump shafts, and configured with a couple groove to receive the pump shaft collar, the coupler halves configured to respond to a force that moves the coupler halves together to couple the pump shaft and motor shaft together and also moves the motor shaft angled collar surface in relation to the couple angled groove surface, causing the pump shaft to move upwardly towards the motor shaft along the axis, so as to provide a way to jack-up and recouple the pump shaft and any impeller attached thereto by one mechanic.

9. Apparatus according to claim 8, wherein the motor shaft collar comprises a tapered washer that is attached to an end of the motor shaft.

10. Apparatus according to claim 8, wherein the motor shaft collar and the motor shaft are formed as an integral unit, including being molded together as one piece.

11. Apparatus according to claim 8, wherein the pump shaft collar comprises a tapered washer that is attached to the pump shaft.

12. Apparatus according to claim 8, wherein the pump shaft collar and the pump shaft are formed as an integral unit, including being molded together.

13. Apparatus according to claim 8, wherein
    the pump shaft collar is configured or formed with a tapered washer that is attached to the end of the pump shaft, the tapered washer including a pump shaft angled collar surface that is oblique to the axis; and
    the couple groove is angled and has a pump shaft couple groove surface that is oblique to the axis, so that when the coupler halves respond to the force, the pump shaft angled collar surface moves in relation to the couple angled groove surface, causing the pump shaft to move upwardly towards the motor shaft along the axis.

14. Apparatus according to claim 8, wherein the apparatus comprises, or forms part of, a vertical in-line split couple pump.

* * * * *